US012537790B2

(12) United States Patent
Gapp et al.

(10) Patent No.: US 12,537,790 B2
(45) Date of Patent: Jan. 27, 2026

(54) SOCIAL MEDIA MODERATION AND CYBERBULLYING PREVENTION SYSTEM

(71) Applicant: RYFFC, LLC, Dover, DE (US)

(72) Inventors: Joshua Gapp, Knoxville, TN (US); Angela Gapp, Knoxville, TN (US)

(73) Assignee: Gregory Gapp, Hopkinsville, KY (US)

( * ) Notice: Subject to any disclaimer, the term of this patent is extended or adjusted under 35 U.S.C. 154(b) by 21 days.

(21) Appl. No.: 18/760,896

(22) Filed: Jul. 1, 2024

(65) Prior Publication Data

US 2025/0007873 A1     Jan. 2, 2025

Related U.S. Application Data

(60) Provisional application No. 63/524,610, filed on Jun. 30, 2023.

(51) Int. Cl.
*H04L 51/52*     (2022.01)
*H04L 51/21*     (2022.01)

(52) U.S. Cl.
CPC ............ *H04L 51/52* (2022.05); *H04L 51/21* (2022.05)

(58) Field of Classification Search
CPC ........ H04L 51/52; H04L 51/21; H04L 51/212
See application file for complete search history.

(56) References Cited

U.S. PATENT DOCUMENTS

| 11,019,015 B1* | 5/2021 | Shapira | H04L 51/52 |
| 11,063,892 B2* | 7/2021 | Fogu | H04L 51/42 |
| 12,001,489 B1* | 6/2024 | Malur Srinivasan | G06F 16/9035 |
| 2017/0206612 A1* | 7/2017 | Benavides | H04L 67/10 |
| 2020/0267165 A1* | 8/2020 | Leliwa | H04L 51/02 |
| 2022/0200945 A1* | 6/2022 | Summers | H04L 51/212 |
| 2023/0353521 A1* | 11/2023 | Boyd | H04L 67/306 |

FOREIGN PATENT DOCUMENTS

EP           3759637 B1 *   11/2022       H04L 63/102

* cited by examiner

*Primary Examiner* — Benjamin M Thieu
(74) *Attorney, Agent, or Firm* — Luedeka Neely, P.C.

(57) ABSTRACT

A method for preventing cyberbullying on a social media messaging platform by limiting comments to user submitted content posts to only two-user conversation exchanges between the author of the content post and the person initiating the conversation exchange. The two users in the conversation exchange are able to submit replies only when it is their turn such that both participants may terminate the conversation exchange by failing to reply to the immediately preceding post by the other user.

17 Claims, 4 Drawing Sheets

SOCIAL MEDIA MODERATION AND CYBERBULLYING PREVENTION SYSTEM

CROSS REFERENCE TO RELATED APPLICATION

This application claims priority to co-pending U.S. Provisional Application Ser. No. 63/524,610 filed Jun. 30, 2023, entitled "Social Media Moderation, Anti-Bullying System, & Other Networking Features," the entire contents of which being incorporated herein by reference.

FIELD

This disclosure relates to social media platforms. More particularly, this disclosure relates to a social medial platform for sharing online content and initiating discussion on the shared content among users while seeking to minimize instances of cyberbullying.

BACKGROUND

Social media platforms are an increasingly prevalent way for people to quickly obtain, share, and discuss news and information. For example, many people rely on social media platforms to be informed of current happenings and events through applications such X®, Instagram®, Facebook®, TikTok®, etc. Similarly, people often use these same platforms to share articles, videos, pictures, etc. (hereinafter collectively referred to as "content") as they surf the Internet. The user may find the content newsworthy, important, funny, wrong, outlandish, etc. and is often shared for initiating discussions with fellow users of the platform and/or the user's own "followers."

While social media platforms are now an important part of everyday life for many people, social media has led to negative effects on mental health and well-being for many users. In particular, the increasing amount of time spent on social media has led to increases in social anxiety, depression, exposure to content that is not age appropriate, cyberbullying, etc.

While bullying is not a new concept, social media technology has raised bullying to a new and different level through pervasive "cyberbullying." In this regard, traditional bullying typically involves a face-to-face interaction in the same space where friends, family, guardians, or other bystanders are present that can intervene or seek assistance. On the other hand, cyberbullying often occurs through various social media and online messaging platforms in which users such as bad actors or trolls publicly or privately message other users through the platform or otherwise add comments to a particular social media post. Due to the digital nature of cyberbullying, the bullying messages can persist indefinitely and lead to negative overall experiences for the user of the particular social media platform. Further, such messages or comments are often made anonymously which makes it difficult to identify the perpetrator, which allows the perpetrator to continue the bullying without consequence.

Similarly, current social media platforms suffer a free speech paradox in attempts to deal with toxicity and/or pervasive cyberbullying occurring on the platform. On one hand, if the platform attempts to treat the symptoms of cyberbullying by blocking certain content or otherwise preventing "bad actors" from continuing to use the platform, they are seen as stifling free speech. Further, to block such content or users, they must make a judgment call on certain content and/or develop algorithms in an attempt to limit types of content that should be blocked. Thus, users lack control over their experience and are often subject to undefined or vague rules on what content is permitted. On the other hand, platforms that attempt to err on the side of allowing virtually all types of content with few limitations so that they are seen as not restricting free speech will likely end up facilitating a hostile environment with pervasive cyberbullying. This situation can keep users from participating on the platform and/or the platform gravitates towards being an echo chamber for certain view points.

Accordingly, there is a need for an improved social media platform designed to embrace and enhance the positives of social media (e.g., sharing of content and initiating commentary on the content being shared) while seeking to eliminate or otherwise minimize to the extent possible the negative effects on mental health and well-being on users, particularly through cyberbullying.

SUMMARY

The above and other needs are met by a method for preventing cyberbullying on a social media messaging platform having a plurality of users including at least a first user, a second user, and a third user. The method includes displaying a user submitted content post authored by the first user through the social media messaging platform to each of the plurality of users; providing a two-user conversation exchange trigger for the user submitted content post. The two-user conversation exchange trigger is operable to be selectively activated by the second user and the third user for generating a response post to the user submitted content post. When the second user activates the conversation exchange trigger to generate a first response post to the user submitted content post, the method further includes: generating a first two-user conversation exchange between the first user and the second user; preventing the plurality of users other than the first user and the second user from participating in the first two-user conversation exchange; and displaying the first two-user conversation exchange to each of the plurality of users. When the third user activates the conversation exchange trigger to generate a second response post to the first user submitted content post, the method further includes: generating a second two-user conversation exchange between the first user and the third user; preventing the plurality of users other than the first user and the third user from participating in the second two-user conversation exchange; and displaying the second two-user conversation exchange to each of the plurality of users.

According to certain embodiments, the method further includes, during the first two-user conversation exchange, preventing the first user from generating reply posts that are not in direct reply to posts from the second user and preventing the second user from generating reply posts that are not in direct reply to posts from the first user. In some embodiments, the method further includes, during the second two-user conversation exchange, preventing the first user from generating reply posts that are not in direct reply to posts from the third user and preventing the third user from generating reply posts that are not in direct reply to posts from the first user. In some embodiments, the method further includes generating and displaying a reply post availability indicator adjacent to the first two-user conversation exchange for indicating to the first user and the second user whether the first user or second user is prevented from generating reply posts.

According to certain embodiments, the method further includes providing a two-way conversation exchange counter operable to determine a number of two-way conversation exchanges generated in response to the user submitted content post, updating the number of two-way conversations in real time, and continually displaying the updated number of two-way conversations in conjunction with the display of the user submitted content post.

According to certain embodiments, the method further includes providing a content post trigger operable to be selectively activated by each of the plurality of users for generating and displaying the user specific content post having the two-user conversation exchange trigger; and preventing the third user from communicating directly with the second user unless (1) the second user generates a second user specific content post and the third user activates the two-user conversation exchange trigger of the second user specific content post; and/or (2) the third user generates a third user specific content post and the second user generates a response post to the third user specific content post by activating the two-user conversation exchange trigger of the third user specific content post.

According to certain embodiments, the method further includes generating the user submitted content post, the step of generating the user submitted content post including providing a content generation interface having at least a first field and a second field; receiving a mandatory URL link in the first field; and receiving a mandatory user submitted commentary regarding the mandatory URL link in the second field. In some embodiments, the method further includes assigning a limited character length for the mandatory user submitted commentary and the response post to the user submitted content post. In some embodiments, the content generation interface includes a third field, the step of generating the user submitted content post further including receiving a mandatory content moderation rating for the user submitted content post in the third field.

According to certain embodiments, the method further includes generating the user submitted content post, the step of generating the user submitted content post including receiving a mandatory content moderation rating from the first user for assigning the user submitted content post to one of a plurality of content moderation levels.

According to another embodiment of the disclosure, a method for preventing cyberbullying on a social media messaging platform having a plurality of users includes: generating a first user submitted content post, the step of generating the first user submitted content post including providing a content generation interface having at least a first field and a second field, receiving a mandatory URL link from a first user in the first field, receiving a mandatory user submitted commentary regarding the mandatory URL link from the first user in the second field, and displaying the first user submitted content post to the plurality of users with a two-user conversation exchange trigger, the two-user conversation exchange trigger being operable to be selectively activated by one of the plurality of users for generating a response post to the first user submitted content post; generating a two-user conversation exchange between the first user and a second user upon activation of the two-user conversation exchange trigger by the second user for generating a response post to the first user submitted content post; displaying the first two-user conversation exchange to each of the plurality of users; and preventing the plurality of users other than the first user and the second user from participating in the first two-user conversation exchange.

According to certain embodiments, the method further includes, during the two-user conversation exchange, preventing the first user from generating reply posts that are not in direct reply to posts from the second user and preventing the second user from generating reply posts that are not in direct reply to posts from the first user.

According to certain embodiments, the method further includes generating and displaying a reply post availability indicator adjacent to the two-user conversation exchange for indicating to the first user and the second user whether the first user or second user is prevented from generating reply posts.

According to certain embodiments, the method further includes providing a two-way conversation exchange counter operable to determine a number of two-way conversation exchanges generated in response to the first user submitted content post, updating the number of two-way conversations in real time, and continually displaying the updated number of two-way conversations in conjunction with the display of the first user submitted content post.

According to certain embodiments, the method further includes assigning a limited character length for the mandatory user submitted commentary and the response post to the first user submitted content post.

According to certain embodiments, the content generation interface includes a third field, the step of generating the first user submitted content post further including receiving a mandatory content moderation rating for the first user submitted content post. In some embodiments, the method further includes assigning the first user submitted content post to one of a plurality of content moderation levels based on the content moderation rating received from the first user; displaying the first user submitted content post with a content moderation trigger, the content moderation trigger operable to be selectively activated by each of the plurality of users for voting on which of the plurality of content moderation levels the first user submitted content post should be assigned; and updating the assignment of the first user submitted content post among the plurality of content moderation levels as votes are received from the plurality of users.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein.

DETAILED DESCRIPTION

The present disclosure is directed to a social media platform having features of a hybrid social media and news application. It should be understood that the features described herein may be used in conjunction with purposes/ content other than news such as longform video content, social media posts from third party platforms, music, pictures, etc. However, for simplicity, the present disclosure is shown and described herein in the context of a social media messaging platform known commercially as RYFFC™.

The general concept for RYFFC is a place for our users to post links to content such as news articles they have come across while surfing the Internet. They might think the article is important, funny, valuable, wrong, outlandish, misinformation, etc.; but most importantly, they want to make a statement (known as a Ryff™ within the RYFFC™ application but will be referred to herein as a "user submitted commentary" or "commentary" for short where applicable) about the article or otherwise open discussion regarding the linked content with other users. The commentary is intended as a short "hot take" authored by the user about the content being posted through the platform. The commentary is preferably of a limited character size (e.g., 88 characters). Similarly, the platform may also allow for users to act as a Citizen Reporter™ by posting about current or ongoing events from their perspective. The Citizen Reporter™ posts will also include user submitted commentary along with user submitted content that is not necessarily a link from the Internet. The idea is to have a place for users to act as a reporter either reporting actual factual events (such as tree is down blocking the road to the subdivision) or making commentator/editorial style content regarding current events (why the local NFL team should trade for a different QB, how the recently passed XYZ law infringes on the rights of the poor, etc.).

Figure 1:
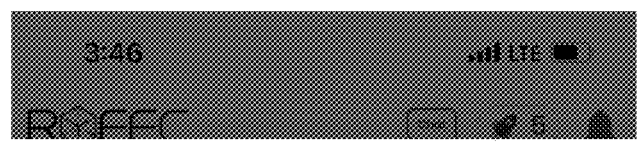
FIG. 1 depicts a content generation interface for a social media platform according to one embodiment of the disclosure.
Figure 1:
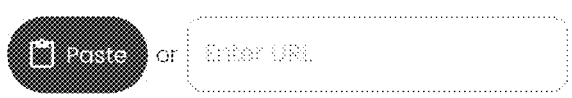
Figure 1:
Figure 1:
Figure 1:
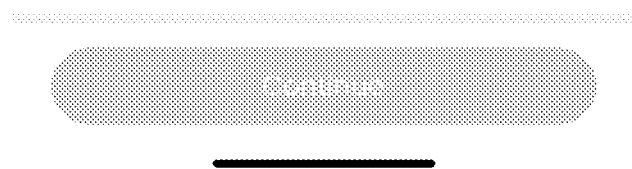

With reference to FIG. 1, the social media platform of the present disclosure provides a content generation interface 10 accessible from a user's home screen of the platform to generate a user submitted content post. As shown in this embodiment that is intended for posting content obtained from the Internet, the content generation interface 10 of this exemplary embodiment includes a first field 12 that allows for the user to either paste a link from the Internet or enter the URL manually. A second field 14 of the content generation interface 10 provides the ability for the user to enter the user submitted commentary for the post. As will be explained in further detail below, the content generation interface 10 of this embodiment further includes a third field 16 for the user to provide a content moderation rating for assigning the content post to one of a plurality of content moderation levels. In preferred embodiments, each of the first field 12, second field 14, and third field 16 are required to completed by the user in order for the platform to generate and display the user submitted content post to other users of the platform.

Figure 2:
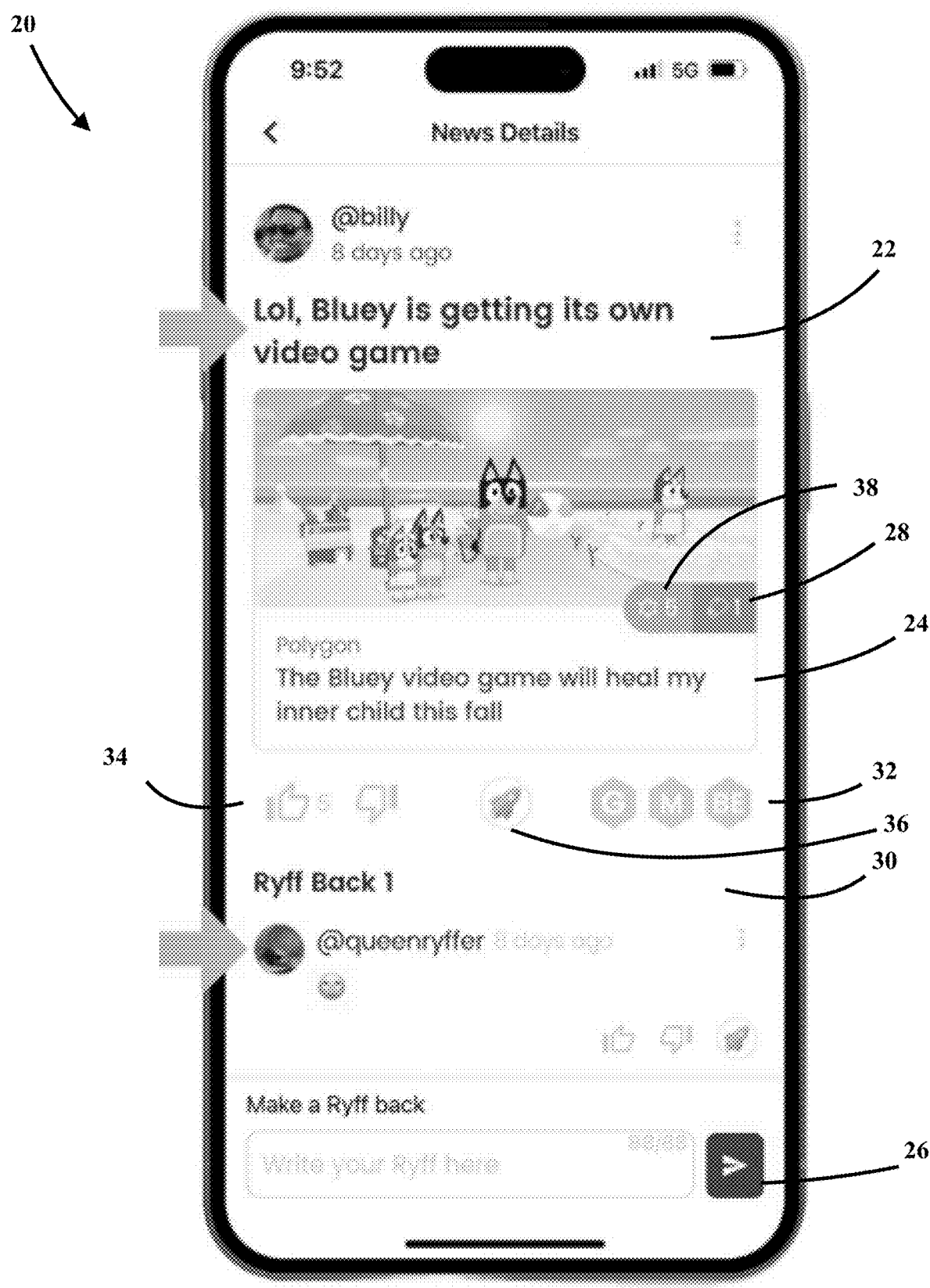
FIG. 2 depicts a content post interface for a social media platform according to one embodiment of the disclosure.

With reference to FIG. 2, an exemplary content post interface 20 is depicted. As shown, interface 20 displays the user submitted commentary 22 in proximity to the linked content 24 (the commentary 22 and linked content 24 collectively referred to as the user submitted content post). In preferred embodiments, the commentary 22 is displayed above the linked content 24 such that it functions as a user generated headline for the linked content 24. Unlike traditional social media platforms, other users of the platform cannot freely comment on the user submitted content post. Instead, the interface 20 includes a two-user conversation exchange trigger 26 in which users must selectively activate for generating a singular response post to the user submitted content post. When generating a response post, a two-user conversation exchange is generated by the platform.

The two-user conversation exchange has two key limitations. First, while other users can always view the entirety of the conversation exchanges, only the author of the user submitted content post and the user that submitted the response post using the two-user conversation exchange trigger 26 may participate in the conversation. In other words, when a two-user conversation exchange is generated, the platform logic actively prevents or otherwise blocks other users from replying or otherwise making any comments within the two-user conversation. Second, both users within the two-user conversation exchange may "walk away" from the exchange at any time by ignoring the immediately preceding reply post generated from the other user. For example, if a second user submits a response post to the original user submitted content post (for purposes of the present disclosure a "response post" is always the first response submitted to the user submitted content post that generates the two-user conversation exchange), the author of the original user submitted content post (i.e., the first user) is permitted to submit a reply post (for purposes of the present disclosure a "reply post" is any post made after the response post). However, the second user in this exchange is not permitted to make further reply posts in the conversation exchange until the first user submits a reply post. Thus, the first user may choose to disengage and end the conversation exchange between the first user and second user by choosing not to reply to the second user's response post. On the other hand, the conversation exchange may continue indefinitely so long as the first and second user in this particular exchange continue to take turns submitting reply posts. Yet another preferable limitation is that each of the response posts and reply reposts include character limitations similar to the original commentary for the user submitted content post.

Taken together, these limitations to the user submitted content post are believed to significantly minimize hostile social media experiences, trolls, undesired communications, spamming, etc. within the social media platform without overly restricting content or blocking users. In this regard, limiting interaction between users to the two-user conversation exchange is built on a foundation of mutually consensual conversations. If one user wants to end or otherwise ignore a conversation exchange, the user has the ability to simply not reply to the other user. Similarly, other users cannot intervene to disrupt an existing conversation. Instead, they must initiate their own two-user conversation exchange with the original author of the user submitted content post or generate their own user submitted content post. Further, with the character limitations, other users cannot go on a long tangent in a particular conversation. They must be brief and to the point and wait for a reply post from the other user if they wish to further engage. This also has the effect of users being more polite and respectful during the conversation exchange because they know that the other user can end the exchange if desired after an offensive or disrespectful post.

With continued reference to FIG. 2, the content post interface 20 further includes a two-way conversation exchange counter 28 that is operable to determine and display a number representing how many two-way conversation exchanges have been generated in response to the user submitted content post displayed by the content post interface 20. In preferred embodiments, the counter 28 continually updates the number of conversation exchanges in real time and continually displays the updated number of two-way conversations in conjunction with the display of the user submitted content post. The two-way conversation exchange counter 28 may also be used by the social media platform to track and prioritize user submitted content posts based on the number of two-way conversation exchanges that have been generated in response to the post. Similarly, the content post interface 20 preferably provides for a user to quickly view other two-way conversation exchanges by scrolling through a conversation exchange section 30 accessible from the user submitted content post.

With reference back to FIG. 1, and as noted above, the content generation interface 10 preferably includes a third field 16 for the user to provide a content moderation rating when submitting a user submitted content post. The content moderation rating options are based on a plurality of content moderation levels assigned by the social media platform. In this example, the social media platform includes three moderation levels: "G" (General), "M" (Moderate), and "BE" (Bleeding Edge). In this embodiment, "G" content should be non-controversial, "M" content should be mild to moderately controversial, and "BE" content should be moderately controversial to offensive. In the settings for each user, users select one of these moderation levels for viewing user submitted content posts. For example, a user that selects a "BE" moderation level will view all user submitted content posts regardless of moderation level, a user that selects a "M" moderation level will view all user submitted content posts except BE assigned posts, and a user that selects a "G" moderation level will only have access to "G" level posts. The user may switch back and forth among moderation levels as desired (e.g., based on mood of the user). Further, minor users may be assigned certain moderation levels based on age and/or guardian permissions.

In preferred embodiments, every user submitted content post will be assigned a moderation level. In certain embodiments, the moderation is assigned initially by the user when generating the user submitted content post such as depicted in FIG. 1. With reference to FIG. 2, the content post interface further includes a moderation level voting field 32 in which other users are also able to vote which level of content moderation the user believes the post belongs within. Tallying the results of these votes in real time, the post is continually filtered into one of the three feeds: "G", "M" or "BE."

With continued reference to FIG. 2, each user submitted content post preferably includes a like/dislike field 34 as is typical of most social media platforms. Users will be able to like or dislike a post only once. However, the platform of this embodiment further includes a boost field 36 in which users can also Superboost™ (referred to hereinafter as an "enhanced approval") user submitted content post. For example, an enhanced approval may be equivalent to a certain number of likes or other assigned value when counting positive user engagement (see "score" feature described below). Enhanced approvals are intended as a rare commodity (as compared to the like/dislike ratings which are always available to the user for a particular post). Users may have the ability to acquire enhanced approvals by either buying them OR earning them through interacting with the social media platform (e.g., making posts, sharing posts, etc.). To further encourage engagement with the platform, enhanced approvals could have a real dollar value that could be calculated periodically, and the social media platform could distribute portions of the profits or revenue from those enhanced approvals to content creators who have had their posts enhanced by other users in proportion to the numbers of enhanced approvals they have received.

According to certain embodiments, an enhanced approval animation is further provided so that when a user presses the enhanced approval field to engage the function, the icon of a rocket ship (using the exemplary RYFFC™ Superboost™ embodiment) will "take off" throwing off fire, sparks, and fireworks. The post itself could also shake, the phone may vibrate, and/or a unique noise will be made from the speaker. The objective is to make the enhanced approval feature (and the social media platform as a whole) a multisensory experience as much as possible to drive engagement. In preferred embodiments, there is no dislike equivalent to the enhanced approval.

With continued reference to FIG. 2, user submitted content posts shown on the content post interface 20 will preferably have a continually updated score field 38. For example, the score is a total of Likes minus Dislikes plus enhanced approvals (multiplied by 5). The score functions as a quick metric by which users can gauge the popularity of a given post amongst other users compared to other posts.

Figure 3A:
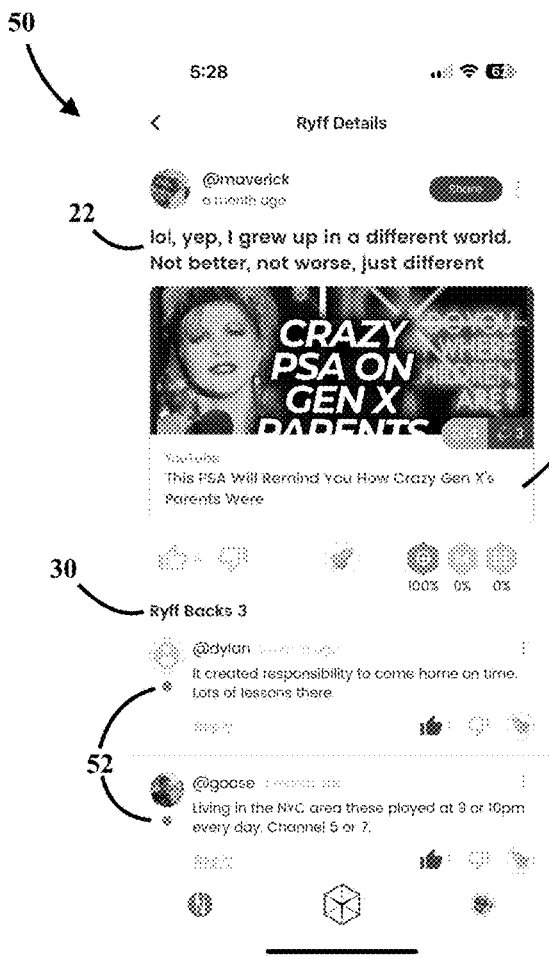
FIG. 3A-3B depict an exemplary authored post interface from the perspective of the author of a user submitted content post according to one embodiment of the disclosure.
Figure 3B:

With reference to FIGS. 3A-3B, an authored post interface 50 is depicted according to one embodiment of the disclosure. An authored post interface 50 is similar to the content post interface 20 of FIG. 2 except it is from the perspective of the author of a user submitted content post. As shown, the authored post interface 50 similarly displays the original user submitted content post with the user submitted commentary 22 in proximity to the linked content 24. It also includes the conversation exchange section 30 for displaying the two-user conversation exchanges to the user submitted content post. In this example, the post includes three two-user conversation exchanges with the author of the content post (@maverick in this example) having submitted a reply post in the third two-user conversation exchange.

As also shown in the embodiment of FIGS. 3A-3B, the platform may further include a reply post availability indicator 52 adjacent each response post or reply post. The indicator 52 quickly lets the author (or user in other interfaces) know whether it is the author's turn to make a reply post in the two-user conversation exchange. For example, with reference to FIG. 3B, the indicator 52 could be either a green light 52a indicating that it is the author's turn to make a reply post in the two-user conversation exchange or a red light 52b indicating that is the other user's turn to make a reply post.

Figure 4:
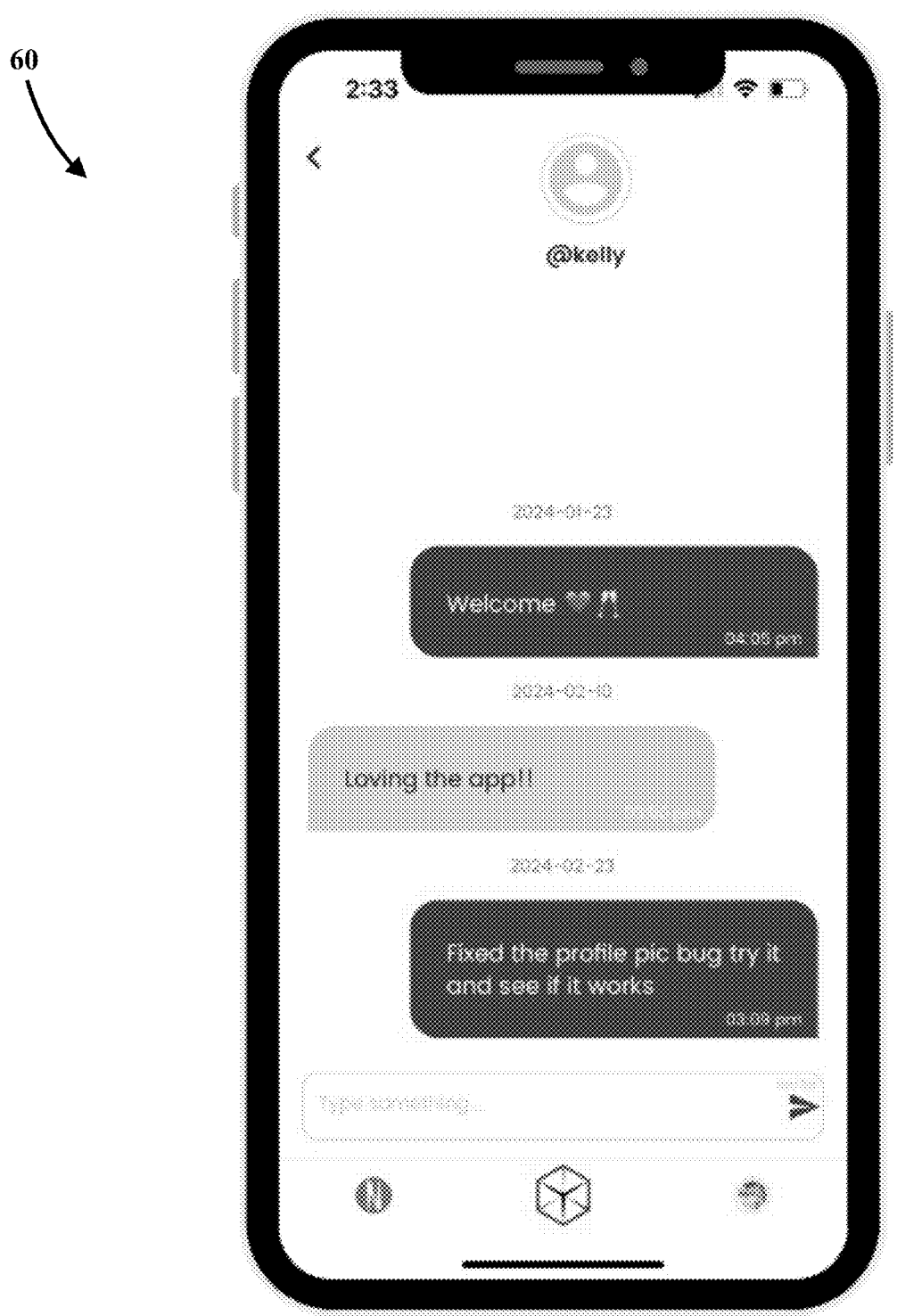
FIG. 4 depicts an exemplary chat interface according to one embodiment of the disclosure.

According to another aspect of the disclosure, the social media platform further includes a chat feature with cyberbullying preventive measures. With reference to FIG. 4, a chat interface 60 is depicted according to an exemplary embodiment of the disclosure. In preferred embodiments, chat availability is limited to being between two users (i.e., group chats are not available through the platform). The platform then has different chat rules based on whether the two users follow each other. In preferred embodiments, a user follows another user by activating a "follow" or similar button corresponding to the user they would like to follow. As it relates to the chat feature, by following another user, the first user that activated the follow of the second user gives the second user the permission to chat with the first user without limitations. If both users follow each other, the two-user conversation exchange rules do not apply, and messages can be sent by either user regardless of whether the other user has responded.

However, if the first user and second user do not follow each other, the chat functions similar to the two-user conversation exchange described above. Each user must take turns when sending private chat messages with the only exception being the initial message the first user sends to initiate the chat conversation. The scenario changes when only one of the users is following the other user. For example, if the first user follows the second user but the second user does not follow the first user, this means that the first user has given permission to the second user to chat with the first user as much as the second desires. However, the second user has not given this same permission to the first user. Thus, in this scenario, the second user can chat freely with the first user with no restrictions on the frequency of such messages. However, because the second user has not followed the first user, the first user is prevented from sending messages to the second user unless it is in direct reply to the latest message from the first user (i.e., similar to the two-conversation rules described above with the exception that the second user could send the very first message to initiate a chat with the first user). In the chat, messages are preferably still limited in character length similar to the response posts and reply post described above (e.g., 88-character limit).

Other potential features of the social media platform of the present disclosure are provided below. One potential feature is that, if a user is especially interested in certain content of a particular user submitted content post, the application allows the user to quickly see what other users are saying about the same article by making a specified action (e.g., swiping motion to carousel through other content posts regarding the same linked URL). A similar function can be provided in a "trending" section where users view the content posts that are getting the most user interactions that day (or any specified time-period). Once a user finds a content post in the trending section, they can then swipe/carousel to see view what users are commenting about the same content.

According to another aspect of the disclosure, the typical action for like/disliking a post is altered from a button push on the touch screen to a swipe motion with animations shaking the post, having a thumbs up/down materialize/appear on the screen, and/or a vibration of the phone and a unique sound. The intention is to make the make the like/dislike rating more of an engaging experience for most of the user's senses (i.e., to make it more fun).

According to another aspect of the disclosure, a "Steal" feature may be provided by a special icon where a user can "Steal" the URL a different user used for their post. For example, if a first user sees a content post by a second user with a particular news article being linked, and the first user wants to make their own content post about the article independent of the second user's post, the first user can "Steal" the URL directly from the second user's post without having to go search the web for the same article.

In an additional "Citizen Reporter" feature, a dual camera setup is available to the user to aid in their post. This feature will utilize both the rear facing camera on the phone to capture the topic of interest for a news report and simultaneously the front facing camera to capture the face of the "Citizen Reporter" reporting on the topic.

In a "Live Feed" feature, the user is provided posts from users in real time (similar to a stock ticker). There is no algorithm or anything else interrupting the stream of posts the user has access to. The goal is to provide transparency to the users so they know the application is not shadow banning anyone or secretly trying to direct what content they are being exposed to.

As for the filter system for the main feed, the filters may be an optional setting for the user to easily set the order of their main feed. For example, the filter setting may be set to Live Feed (no filters), Following (feed consists of posts from people the user is following), Recap (algorithmic feed where the application tries to anticipate which posts the user will find most interesting given what is known about the user's posting and viewing habits), Topics (populate the user's feed with posts about given topics requested by the user), and Above the Fold (trending/most popular posts).

With respect to Topics, one feature may be that every time a user makes a post, the user will have the option to tag the post with a small set of topics. The user defined topics will assist the application in placing the articles and posts into the correct feed for other users.

In certain embodiments, the social media platform offers video background and transition templates to users (their option to use or not) as a mechanism to increase the production quality of the videos, in particular the Citizen Reporter videos. Many of these templates will be created by the provider of the application. However, there may also be provided a "marketplace" where other users can create templates and offer (for free or $) to allow other users to use said templates in their production.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by any claims when interpreted in accordance with the breadth to which they are fairly, legally, and equitably entitled.

What is claimed is:

1. A method for preventing cyberbullying on a social media messaging platform having a plurality of users including at least a first user, a second user, and a third user, the method comprising:
    displaying a user submitted content post authored by the first user through the social media messaging platform to each of the plurality of users; and
    providing a two-user conversation exchange trigger for the user submitted content post, wherein the two-user conversation exchange trigger is operable to be selectively activated by the second user and the third user for generating a response post to the user submitted content post;
    wherein, when the second user activates the conversation exchange trigger to generate a first response post to the user submitted content post, the method further includes:
        generating a first two-user conversation exchange between the first user and the second user;
        preventing the plurality of users other than the first user and the second user from participating in the first two-user conversation exchange; and
        displaying the first two-user conversation exchange to each of the plurality of users, and
        wherein, when the third user activates the conversation exchange trigger to generate a second response post to the first user submitted content post, the method further includes:
        generating a second two-user conversation exchange between the first user and the third user;
        preventing the plurality of users other than the first user and the third user from participating in the second two-user conversation exchange; and
        displaying the second two-user conversation exchange to each of the plurality of users.

2. The method of claim 1 further comprising, during the first two-user conversation exchange, preventing the first user from generating reply posts that are not in direct reply to posts from the second user and preventing the second user from generating reply posts that are not in direct reply to posts from the first user.

3. The method of claim 2 further comprising, during the second two-user conversation exchange, preventing the first user from generating reply posts that are not in direct reply to posts from the third user and preventing the third user from generating reply posts that are not in direct reply to posts from the first user.

4. The method of claim 2 further comprising generating and displaying a reply post availability indicator adjacent to the first two-user conversation exchange for indicating to the first user and the second user whether the first user or second user is prevented from generating reply posts.

5. The method of claim 1 further comprising providing a two-way conversation exchange counter operable to determine a number of two-way conversation exchanges generated in response to the user submitted content post, updating the number of two-way conversations in real time, and continually displaying the updated number of two-way conversations in conjunction with the display of the user submitted content post.

6. The method of claim 1 further comprising:
providing a content post trigger operable to be selectively activated by each of the plurality of users for generating and displaying the user specific content post having the two-user conversation exchange trigger; and
preventing the third user from communicating directly with the second user unless (1) the second user generates a second user specific content post and the third user activates the two-user conversation exchange trigger of the second user specific content post; and/or (2) the third user generates a third user specific content post and the second user generates a response post to the third user specific content post by activating the two-user conversation exchange trigger of the third user specific content post.

7. The method of claim 1 further comprising generating the user submitted content post, the step of generating the user submitted content post including:
providing a content generation interface having at least a first field and a second field;
receiving a mandatory URL link in the first field; and
receiving a mandatory user submitted commentary regarding the mandatory URL link in the second field.

8. The method of claim 7 further comprising assigning a limited character length for the mandatory user submitted commentary and the response post to the user submitted content post.

9. The method of claim 7 wherein the content generation interface includes a third field, the step of generating the user submitted content post further including receiving a mandatory content moderation rating for the user submitted content post in the third field.

10. The method of claim 1 further comprising generating the user submitted content post, the step of generating the user submitted content post including receiving a mandatory content moderation rating from the first user for assigning the user submitted content post to one of a plurality of content moderation levels.

11. A method for preventing cyberbullying on a social media messaging platform having a plurality of users, the method comprising:
generating a first user submitted content post, the step of generating the first user submitted content post including:
providing a content generation interface having at least a first field and a second field;
receiving a mandatory URL link from a first user in the first field;
receiving a mandatory user submitted commentary regarding the mandatory URL link from the first user in the second field;
displaying the first user submitted content post to the plurality of users with a two-user conversation exchange trigger, the two-user conversation exchange trigger being operable to be selectively activated by one of the plurality of users for generating a response post to the first user submitted content post;
generating a two-user conversation exchange between the first user and a second user upon activation of the two-user conversation exchange trigger by the second user for generating a response post to the first user submitted content post;
displaying the first two-user conversation exchange to each of the plurality of users; and
preventing the plurality of users other than the first user and the second user from participating in the first two-user conversation exchange.

12. The method of claim 11 further comprising, during the two-user conversation exchange, preventing the first user from generating reply posts that are not in direct reply to posts from the second user and preventing the second user from generating reply posts that are not in direct reply to posts from the first user.

13. The method of claim 11 further comprising generating and displaying a reply post availability indicator adjacent to the two-user conversation exchange for indicating to the first user and the second user whether the first user or second user is prevented from generating reply posts.

14. The method of claim 11 further comprising providing a two-way conversation exchange counter operable to determine a number of two-way conversation exchanges generated in response to the first user submitted content post, updating the number of two-way conversations in real time, and continually displaying the updated number of two-way conversations in conjunction with the display of the first user submitted content post.

15. The method of claim 11 further comprising assigning a limited character length for the mandatory user submitted commentary and the response post to the first user submitted content post.

16. The method of claim 11 wherein the content generation interface includes a third field, the step of generating the first user submitted content post further including receiving a mandatory content moderation rating for the first user submitted content post in the third field.

17. The method of claim 16 further comprising:
assigning the first user submitted content post to one of a plurality of content moderation levels based on the content moderation rating received from the first user;
displaying the first user submitted content post with a content moderation trigger, the content moderation trigger operable to be selectively activated by each of the plurality of users for voting on which of the plurality of content moderation levels the first user submitted content post should be assigned; and updating the assignment of the first user submitted content post among the plurality of content moderation levels as votes are received from the plurality of users.

\* \* \* \* \*